United States Patent [19]

Schiebel

[11] Patent Number: 4,571,604

[45] Date of Patent: Feb. 18, 1986

[54] METHOD OF AND DEVICE FOR THE ELECTROPHOTOGRAPHIC PRINTING OF INFORMATION

[75] Inventor: Ulrich Schiebel, Aachen-Brand, Fed. Rep. of Germany

[73] Assignee: U.S. Philips Corporation, New York, N.Y.

[21] Appl. No.: 642,973

[22] Filed: Aug. 21, 1984

Related U.S. Application Data

[63] Continuation of Ser. No. 354,426, Mar. 3, 1982, abandoned.

[30] Foreign Application Priority Data

Mar. 4, 1981 [DE] Fed. Rep. of Germany ....... 3108115

[51] Int. Cl.[4] ........................ G01D 15/14; H04N 1/30

[52] U.S. Cl. ................................ 346/161; 346/110 R; 358/300

[58] Field of Search ............... 346/108, 110 R, 110 V, 346/150, 157, 158, 161; 358/293, 300, 302, 296

[56] References Cited

U.S. PATENT DOCUMENTS 3,277,237 10/1966 Wolfgang ...................... 346/158 X
3,619,484 11/1971 Tanaka et al. ...................... 346/108
4,135,212 1/1978 Pugsley et al. ................ 358/296 X
4,395,721 7/1983 Ohno et al. ........................ 346/160

*Primary Examiner*—E. A. Goldberg
*Assistant Examiner*—Frederick L. Kampe
*Attorney, Agent, or Firm*—Joseph P. Abate

[57] ABSTRACT

A method of electrophotographic printing of electrically stored information by means of a cathode ray tube. The tube is controlled so that each time only one picture line of the information on the display screen is activated several times in succession. Thus, the transport movement of the record carrier is continuous. The optical system provided between the cathode ray tube and the record carrier may be constructed to be rigid, so that on the record carrier there is formed an image whose individual pixels represent a small line which consists of several overlapping dots. The necessary brightness is achieved by using a cathode ray tube having a wide display screen on which the picture lines to be transferred to the record carrier are displayed with a 1:1 ratio. Furthermore, the display screen is provided with a coarse-grained phosphor of the zinc sulfide type which has a high light yield. Moreover, the line frequency of the cathode beam is increased beyond the customary value in order to counteract phosphor saturation.

7 Claims, 3 Drawing Figures

METHOD OF AND DEVICE FOR THE ELECTROPHOTOGRAPHIC PRINTING OF INFORMATION

This is a continuation, of application Ser. No. 354,426, filed Mar. 3, 1982, now abandoned.

BACKGROUND OF THE INVENTION

The invention relates to a method of and a device for the electrographic printing of electrically stored information, using a cathode ray tube whose luminescent layer is line-sequentially scanned by a cathode beam in accordance with the information stored, and also using a photoconductive record carrier on the photoconductive layer of which a mosaic-like latent charge image is formed by the activated luminescent layer of the cathode ray tube via an optical system, said charge image being subsequently developed and the developed image being transferred to a further record carrier, the minimum line frequency with which the cathode beam is deflected corresponding to the quotient of the transport speed of the record carrier and the line interval.

From U.S. Pat. No. 3,947,190 an electrophotographic apparatus is known in which the light-emitting elements of a character to be printed which are activated on the display screen of a cathode ray tube are optically transferred to a record carrier by way of an optical system which consists of mirrors and lenses. The complete character is displayed matrix-wise on the display screen and is transferred to the record carrier. The electron beam of the tube is to be horizontically and vertically deflected for this purpose. In order to keep the dimensions of the tube small, the individual light-emitting elements are smaller than the pixels to be recorded on the record carrier, so that the optical system must perform an enlargement of the light-emitting elements to be transferred. However, the lack of definition of the light-emitting elements is also increased, so that a hazy print of the image to be recorded is obtained on the record carrier. Moreover, the brightness of the light-emitting element to be transferred, thus, also decreases. These drawbacks could be mitigated to some extent by increasing the beam current of the cathode ray tube, but they cannot be avoided in that manner. Furthermore, there is a drawback in that the record carrier must remain stationary during the character transfer from the cathode ray tube. Thus, the transport of the record carrier is intermittent. This implies a comparatively high energy consumption and a complex technical construction which is, moreover, subject to substantial wear.

Furthermore, from U.K. Patent Application No. 2047916A, published Dec. 3, 1980, an electrophotographic printer is known in which the display screen of the cathode ray tube comprises optical fibers which transfer the activated light image directly to the record carrier without a special optical system. However, because the optical fibers cannot be arranged near the record carrier because of contamination of the fibers by the developer and the risk of damaging of the fibers, the light spot to be transferred is again enlarged, so that a low resolution of the latent image on the record carrier is obtained. Moreover, this device has the drawback that, in order to maintain a small, constant distance between the optical fibers and the record carrier, a precision positioning and adjustment mechanism is required.

SUMMARY OF THE INVENTION

It is an object of the invention to provide a method of and a device for the electrophotographic printing of characters and images in which the individual light-emitting elements of the cathode ray tube can be generated with a comparatively small beam current and exhibit an adequate brightness, without using contact exposure by means of optical fibers, so that a latent image having a suitable resolution is obtained on the record carrier.

This object is achieved by a method in which each individual picture line of the charge image to be recorded is separately formed on the display screen of the cathode ray tube by the cathode beam which is controlled in accordance with the information stored, said picture line being transferred, by means of an optical imaging system, to the record carrier on which it is recorded, the cathode beam scanning the same picture line on the display screen a number of times in succession with a line frequency which is higher than the minimum line frequency, the record carrier being continuously transported during said scanning.

Because the record carrier is continuously transported, the activated light-emitting elements of the cathode ray tube are slightly shifted in the vertical direction on the record carrier during each successive scan. Thus, single dots are no longer formed, but rather small lines which consist of overlapping dots. The length of these lines depends on the number of scans and on the speed at which the cathode beam scans the same line (the frequency), and also on the transport speed of the record carrier.

In order to obtain a higher brightness of the light-emitting elements as well as an improved resolution, the light-emitting elements of the picture line are displayed on the display screen with dimensions which equal those of the pixels to be recorded on the record carrier. The optical system used, therefore, only serves to guide and focus the light beams from the display screen onto the record carrier without enlargement, so that a "1:1 transfer" from the cathode ray tube to the record carrier takes place.

The method utilizes a cathode ray tube whose display screen has a height which is substantially smaller than its width. Only a single deflection system is then provided for horizontal deflection of the cathode beam. In this case, the repeated scanning of the same line in the light-emitting area produces a pixel in the form of a vertical line consisting of several overlapping dots on the record carrier, said line being observed substantially as a dot by the human eye.

Moreover, because the light-emitting elements need not be enlarged to the predetermined pixel dimensions, the display screen may be provided with a comparatively coarse-grained, high-efficiency luminescent phosphor layer.

BRIEF DESCRIPTION OF THE DRAWINGS

The invention will be described in more detail in conjunction with the accompanying drawing figures, in which.

DESCRIPTION OF THE PREFERRED EMBODIMENTS

Figure 1:
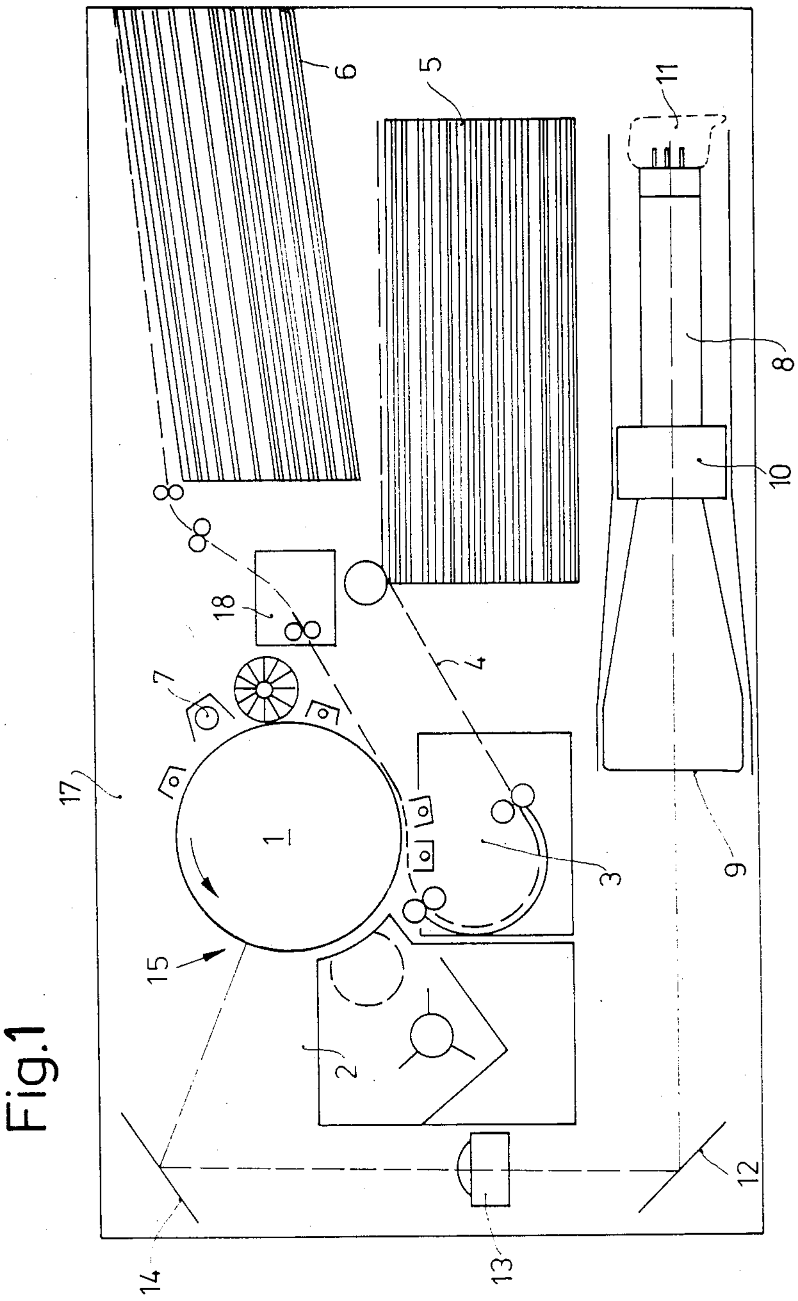
FIG. 1 shows the construction principle of an electrophotographic printer.

FIG. 1 shows an electrophotographic printer. A housing 17 accommodates all modules required. On the display screen 9 of a cathode ray tube 8 whose connection 11 is connected to associated electronics (not shown), digitally stored alphanumeric or graphic information is displayed and the optical light image is transferred, by means of an optical system which consists of the mirrors 12 and 14 and the lens 13, to an endless record carrier 1, for example, a drum or band which comprises a photoconductive layer. Thus, a latent charge image is formed in the recording area 15 of the record carrier 1, said charge image corresponding to the information to be recorded. The record carrier continuously rotates in the direction of the arrow. The latent charge image is developed in a developing station 2 and is transferred to a normal sheet of paper 4 in the transfer station 3. The sheet 4 is derived from a stack 5 and, after the transfer of the image and its fixation in the fixation station 18, it is stacked in a stacker 6. After the transfer, the record carrier 1 has its latent image removed and is cleaned in the cleaning station 7.

Figure 2:
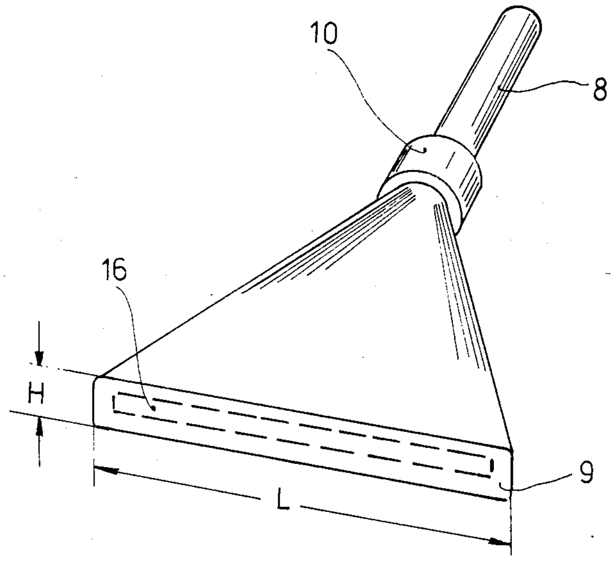
FIG. 2 is a perspective view of the cathode ray tube.

For the cathode ray tube 8, use is made of a tube as shown in FIG. 2 which comprises a truly flat, rectangular display screen 9 having a length L of approximately 210 mm. This corresponds to approximately the width of a DIN A4-sheet. The height H amounts to approximately 20 mm. The cathode beam which is only horizontally deflected by the deflectin system 10 covers a light-emitting area 16 whose height corresponds approximately to the diameter of the pixels to be recorded on the record carrier 1. In this area each time only one picture line of the information to be recorded is displayed. A picture line is understood to mean herein a line of pixels of all characters to be printed on the DIN A4-sheet. The same picture line is displayed several times, preferably at least three times, on the display screen 9, i.e. the light-emitting area is scanned several times by the cathode beam with the same line content. The beam can activate the light-emitting area 16 only in the same direction or during the forward and the flyback deflection. The repeated display of the same picture line information is performed in order to increase the line frequency and hence, the deflection speed of the electron beam in the tube. At an increased deflection speed (=light spot velocity $v$ on the screen), the saturation of the phosphors on the display screen of the tube is mitigated. As a result, a higher brightness of the phosphor layer of the display screen 9 is obtained, so that the intensity of the latent image recorded on the record carrier 1 is higher.

The display screen 9 of the cathode ray tube 8 comprises a high-efficiency phosphor layer, for example, a zinc cadmium sulfide layer with an addition of copper. Such a layer offers a high brightness of the light-emitting elements with a comparatively small beam current of the cathode ray tube. Contrary to the known phosphors used in electrographic printers, the phosphor used offers a light efficiency of 15% instead of only from 2 to 5%.

The phosphors of the ZnS type have a high light efficiency with a small beam current, but as the load increases they very quickly enter the saturation range. This range, however, can be shifted very far towards the high beam currents by increasing the line frequency. Even though the recording speed is thus slightly reduced, a faithfull print of the information is obtained by the repeated activation of the tube with the same information content, i.e. a given picture line.

The invention was tested in a prototype for which the following values were used:

Sensitivity of the photolayer: $S=5\cdot10^{3}J/m^{2}$

Transfer efficiency of the optical system (with a light intensity of approximately 1:4.5): $\beta=3\cdot10^{-3}$ Transport speed of the record carrier: V=0.165 m/s Exposure width (DIN A4): b=0.2 m With these values, a required radiant power P′ of approximately 60 mW resulted in accordance with the formula $$P'=S\cdot b\cdot(V/\beta)$$

Figure 3:
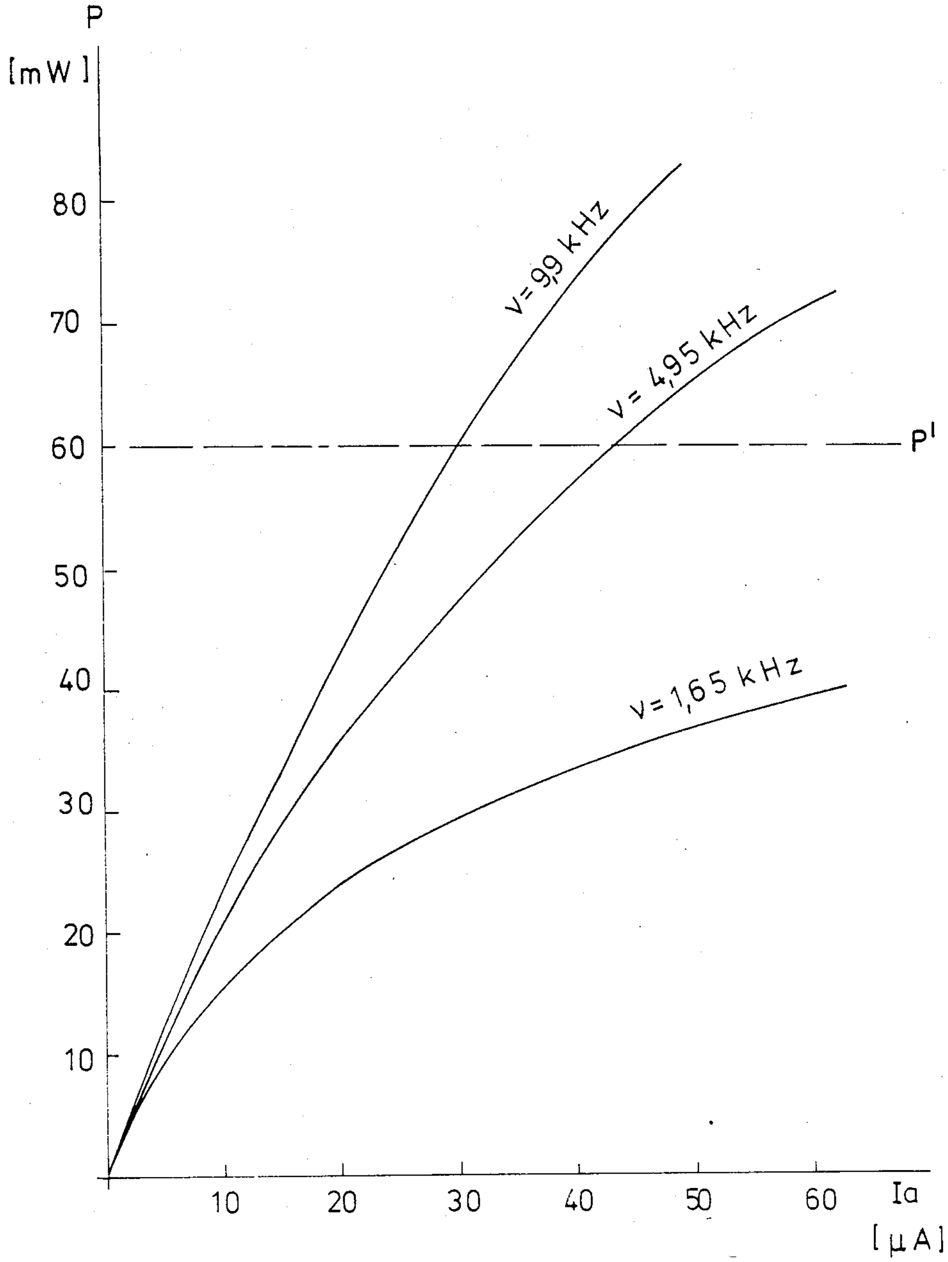
FIG. 3 shows a diagram of the radiant power of the cathode ray tube at different line frequencies.

This required radiant power P′ is denoted by a broken line in the diagram of FIG. 3.

For a line interval of 0.1 mm, the minimum line frequency $v$ amounts to 1.65 kHz, i.e. per picture line for one scan of the light-emitting area 16 (lower curve in FIG. 3). It has been found that the desirable radiant power P′ could not be reached in this way. However, when the line frequency $v$ was increased by a factor 3, i.e. three scans of the same light-emitting area 16, a frequency of 4.95 kHz with a light yield of 60 mW was obtained. This required an anode current Ia of only 43 $\mu$A (central curve of FIG. 3). When the line frequency $v$ was increased by a factor 6, i.e. six scans of the light-emitting area 16, to 9.9 kHz, a beam current Ia of only 30 $\mu$A was required (upper curve of FIG. 3).

This example demonstrates that the radiant power required for electrophotographic printing in the medium speed range (15 to 30 sheets DIN A4/min) can be achieved by means of cathode ray tubes even when use is made of standard, commercially available optical imaging elements with a moderate light intensity.

A sufficiently long service life of the phosphor layer of the displays screen 9 is obtained by shifting the beam in the vertical direction over approximately half the diameter of the light-emitting element (approximately 50 $\mu$m) after each printing operation of a picture line extending across the entire width of the DIN A4 sheet. After a total shift of approximately 3 mm, a shift back to the starting line can be performed, the vertical deflection cycle then commencing again. A useful screen area (light emitting area 16) of $0.3\times20$ cm$^2$=6 cm$^2$ is thus obtained, which leads to a radiant power of from approximately 0.15 to 0.2 W/cm$^2$ with the values stated above. This radiant power corresponds to a service life of far more than 1000 hours for the cathode ray tube.

What is claimed is:

1. A method of electrophotographic printing of electrically stored information, comprising:

line-sequentially scanning a luminescent layer of a cathode ray tube by means of a cathode beam of the tube which beam is controlled in accordance with stored information;

forming a line of a mosaic-like latent charge image on a photoconductive layer of a first moving record carrier, said forming step including optically coupling the activated luminescent layer of the tube with the record carrier;

developing the formed image, and transferring the developed image to a second moving record carrier, said line-sequentially scanning step further including the cathode beam scaning the same line on the luminescent layer a number of times successively with the same information and with a line frequency which is greater than a minimum line frequency corresponding to a quotient determined by the speed of the first carrier and the line interval between two consecutive lines to be formed on the first carrier, said forming step further including the first record carrier moving continuously during said line-sequentially scanning step.

2. A method as clamed in claim 1, characterized in that the size of light-emitting elements generated on a display screen of the cathode ray tube by the cathode beam corresponds to that of the pixels to be recorded on the record carrier.

3. A method as claimed in the claims 1, characterized in that the line frequency of the cathode ray tube deflection is increased by a factor from 2 to 10 with respect to the minimum line frequency.

4. The method claimed in the claim 1, characterized in that the height (H) of a display screen (9) of the cathode ray tube is essentially smaller than its width (L).

5. The method as claimed in claim 4, characterized in that the display screen 9 is provided with a high-efficiency phosphor layer.

6. The method as claimed in the claim 4, characterized in that the height of a light-emitting area (16) corresponds approximately to the size of pixels to be recorded on the record carrier (1), a deflection system (10) being provided only for the horizontal deflection of the cathode beam.

7. The method as claimed in the claim 4, characterized in that there is provided a vertical deflection system which deflects the cathode beam over approximately one half picture line height after each display of a picture line of the same information content, the deflection returning to the first picture line after several vertical deflections.

* * * * *